(12) United States Patent
Hora

(10) Patent No.: US 6,236,920 B1
(45) Date of Patent: May 22, 2001

(54) DISTRIBUTED VEHICLE SAFETY WITH BUS CONNECTION COMPONENTS HAVING A REMOTELY-LOCATED INITIATION ELECTRONICS ARRANGEMENT AND A BUS TAP ARRANGEMENT

(75) Inventor: Peter Hora, Schrobenhausen (DE)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/333,854

(22) Filed: Jun. 15, 1999

(51) Int. Cl.$^7$ ............................... G06F 17/00; G06F 7/00
(52) U.S. Cl. ........................... 701/45; 701/49; 180/268; 180/271; 280/735
(58) Field of Search ................................. 701/45, 47, 49; 280/735; 180/268, 271, 274, 281

(56) References Cited

U.S. PATENT DOCUMENTS

| | | | |
|---|---|---|---|
| 5,825,098 | 10/1998 | Darby et al. | 701/45 |
| 5,835,873 | 11/1998 | Darby et al. | 701/45 |

OTHER PUBLICATIONS

A SAE publication entitled "Bus System for Wiring Actuators of Restraint Systems", by Bauer et al., and believed to have been published in 1996.

Primary Examiner—William A. Cuchlinski, Jr.
Assistant Examiner—Gertrude Arthur
(74) Attorney, Agent, or Firm—Tarolli, Sundheim, Covell, Tummino & Szabo L.L.P.

(57) ABSTRACT

A distributed vehicle safety system (10) includes an actuatable safety system device (e.g., 16) and a central controller (14) for outputting communication regarding actuation of the device. A communication bus (36) extends from the central controller (14) toward the device (16) and conveys the communication. A bus plug unit (68) of a connection assembly (e.g., 50) is located remote from the device (16). The bus plug unit (68) is connected to the bus (36) and controls actuation of the device (16) in response to communication on the bus. Preferably, the bus plug unit (68) includes a portion (78) that interrupts a normally through-connected portion (84) of the bus (36), and includes portions (72 and 74) that connect to a conductor (38) of the bus on two sides of the interrupted portion upon connection of the bus plug unit to the bus.

12 Claims, 3 Drawing Sheets

DISTRIBUTED VEHICLE SAFETY WITH BUS CONNECTION COMPONENTS HAVING A REMOTELY-LOCATED INITIATION ELECTRONICS ARRANGEMENT AND A BUS TAP ARRANGEMENT

TECHNICAL FIELD

The present invention is generally directed to a vehicle safety system, such as an occupant protection system, that has a central controller and a plurality of remote devices. The present invention is particularly directed to a system with an architecture that utilizes bus connection components for housing initiation electronics and that provides an expedient bus tap.

BACKGROUND OF THE INVENTION

One type of vehicle safety system is an occupant protection system. The protection system includes one or more actuatable protection devices for protecting (e.g., restraining) an occupant of a vehicle. Examples of such protection devices include an air bag module, a knee bolster module, and a seat belt pretensioner module.

As the sophistication of occupant protection systems has increased, the number and complexity of the protection devices in a single vehicle has increased. In response to the increased number and complexity of devices, there has been a movement toward centralized control of the devices to reduce cost and to increase reliability of the overall protection system. In order to accomplish the centralized control, a bus architecture is used for conveyance of communication signals. A potential exists that bus communications may be interrupted by such occurrences as crushing during a vehicle collision and associated deployment actuation of the protection devices within the system.

Also, because of the increase in the number and complexity of the devices within a single system, the number of connections that must be completed during assembly of a vehicle has increased. Thus, there are needs for increased efficiencies regarding assembly manufacturing of such systems. For example, it is desirable that connections be robust such that workers on a manufacturing assembly line can expediently make necessary connections. Also, components that can be used within more than one vehicle platform permit efficiencies via standardization.

SUMMARY OF THE INVENTION

In accordance with one aspect, a present invention provides a distributed vehicle safety system. The system includes an actuatable safety system device and a central controller for outputting communication regarding actuation of the device. A communication bus extends from the central controller toward the device and conveys the communication. The system includes connector/control means that is located remote from the device. The connector/control means is for connection to the bus and for controlling actuation of the device in response to communication on the bus.

In accordance with another aspect, the present invention provides a system that includes an actuatable safety system device and a central controller for outputting communication regarding actuation of the device. Bus means of the system conveys the communication. Connector/control means interrupts a normally through-connected portion of the bus means to enable communication reception from the bus means by the connector/control means, and controls actuation of the device in response to communication received at the connector/control means.

In accordance with yet another aspect, the present invention provides a system with an actuatable safety system device and a central controller for outputting communication regarding actuation of the device. A communication bus extends from the central controller toward the device and conveys the communication. The bus includes a conductor. A connector, associated with the device, connects to the bus and receives the communication. The connector includes means for interrupting a through-connected portion of the conductor upon connection of the connector to the bus.

In accordance with still another aspect, the present invention provides a connector plug of a vehicle safety system for connection into a communication bus that includes an electrical conductor. The connector plug includes means for interrupting a through-connected portion of the conductor during connection of the connector plug to the bus. The connector plug includes means for connecting to the conductor on one side of the interrupted portion, and means for connecting to the conductor on the other side of the interrupted portion.

BRIEF DESCRIPTION OF THE DRAWINGS

The foregoing and other features and advantages of the present invention will become apparent to those skilled in the art to which the present invention relates upon reading the following description with reference to the accompanying drawings, wherein.

DESCRIPTION OF PREFERRED EMBODIMENT

Figure 1:
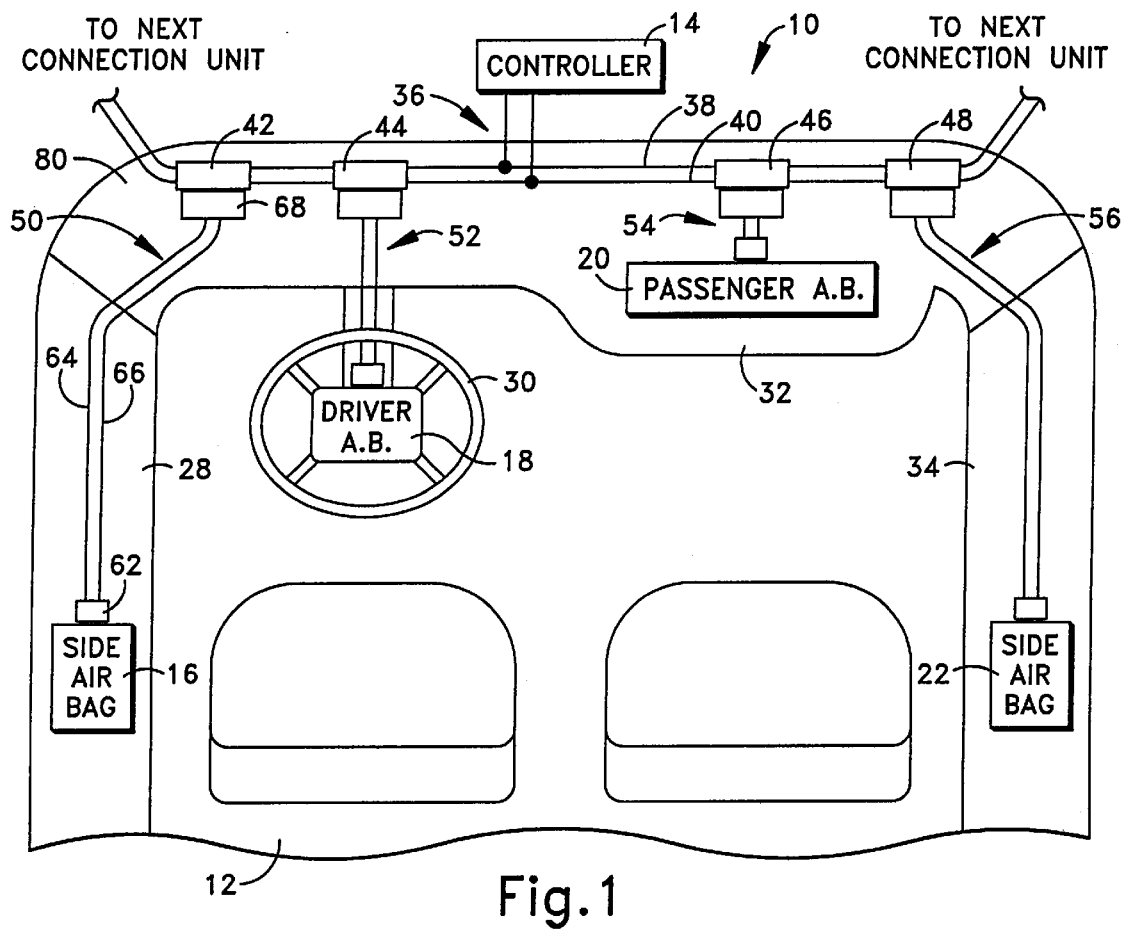
FIG. 1 is a schematic illustration of an occupant protection system in accordance with the present invention within an associated vehicle.

A representation of the present invention is schematically shown in FIG. 1 in a distributed safety system 10 within an associated vehicle 12. The system 10 includes a central controller 14 and a plurality of remotely located devices (e.g., four devices are shown in FIG. 1 and are identified 16–22). The plurality of devices may be any combination of safety system devices.

In the preferred embodiment, the system 10 is a vehicle occupant protection system for helping to protect one or more occupants (not shown) of the vehicle 12. Accordingly, the devices are hereinafter generically referred to as protection system devices. Within the system 10, some of the protection system devices are actuatable to help protect (e.g., restrain) an occupant, and some of the devices are used to determine control (e.g., actuation command) of the actuatable protection devices.

Examples of actuatable protection devices include an air bag module, a knee bolster module, a seat belt lock, a seat belt pretensioner module, and a D-ring adjuster module. For the purpose of illustration of the invention and not for the purpose of limitation, the four shown devices 16–22 are actuatable protection devices. Further, for the purpose of illustration of the invention and not limitation, the shown devices 16–22 are air bag modules. The four shown air bag modules 16–22 are, respectively, a driver side air bag module 16, a driver front air bag module 18, a passenger front air bag module 20, and a passenger side air bag module 22.

Figure 2:
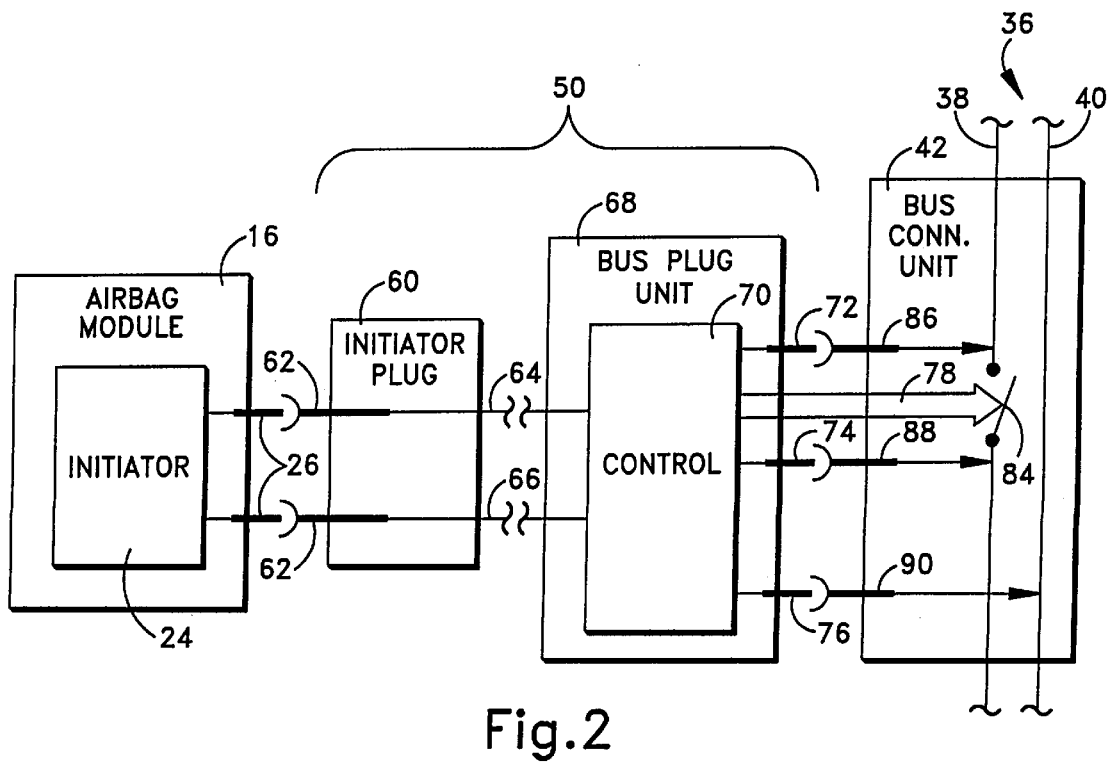
FIG. 2 is a block diagram of a portion of the system shown within FIG. 1.

Each of the air bag modules 16–22 includes appropriate structure to accomplish its associated occupant protecting function. For example, each air bag module includes an associated inflatable restraint (not shown), commonly referred to as an air bag. The air bag is stored in a folded condition within the module in a manner well known in the art. A source (not shown) of inflation fluid (e.g., nitrogen gas) is provided to inflate the associated air bag. The source of inflation fluid is commonly referred to as an inflator, and includes a stored quantity of pressurized inflation fluid and/or an inflation fluid generating material. The inflator has an associated initiator 24 (FIG. 2, e.g., a pyrotechnic squib), which is electrically activated to initiate flow of the inflation fluid from the inflator. Inflation fluid flowing to the air bag inflates the air bag, as will be appreciated by a person of ordinary skill in the art. A pair of connection leads 26 extends from the initiator 24 for receipt of an electrical activating signal.

The protection system devices that are involved in the determination of control (e.g., actuation) of the actuatable protection system devices (e.g., the air bag modules) include sensor devices (none shown). Each sensor device senses a characteristic that is used to determine whether the additional protection help (e.g., air bag restraint of occupant) is to be provided (e.g., actuation deployment of one or more of the air bag devices) and/or how the additional protection help is to be provided (e.g., adjustment of deployment of one or more of the air bag devices). Each sensor device outputs a signal that conveys information regarding the sensed characteristic. Examples of sensor devices include a vehicle crash sensor (e.g., an accelerometer), an occupant position sensor (e.g., an ultrasound or an infrared sensor), and an occupant weight sensor (e.g., a pressure sensor).

The central controller 14 receives sensory input (i.e., the information conveying signals) from the sensor devices and using the sensory input regarding the sensed characteristics makes determinations regarding actuatable protection device control. In one example, the central controller 14 analyzes the information derived from the sensed characteristics and determines if a deployment crash condition is occurring (e.g., the central controller performs a crash algorithm). A deployment crash condition is one in which deployment of one or more of the air bag modules is desirable to hopefully, in combination with other vehicle systems (e.g., seat belts or the like), enhance protection of the occupant. Preferably, the central controller 14 includes a microcomputer (not shown) to perform this function.

The protection system devices are located in a distributed manner throughout the vehicle 12. Turning to the example illustrated in FIG. 1, the driver side air bag module 16 is located in a driver door 28, and the driver front air bag module 18 is located on a hub of a steering wheel 30. The passenger front air bag module 20 is located within an instrument panel 32 and the passenger side air bag module 22 is located in a passenger door 34. The sensor devices (not shown) may also be located at remote locations within the vehicle 12.

A communication bus 36 extends from the central controller 14 through the vehicle toward locations of the protection system devices. Conveyance of sensory signals from the sensor devices to the central controller 14 and the conveyance of control signals from central controller to the actuatable protection devices (e.g., 16–22) are accomplished via the bus 36. The bus 36 includes two electrical conductor lines 38 and 40, and a plurality of bus connection units (four shown, 42–48). Each bus connection unit (e.g., 42) provides an interface at the bus 36.

At least some of the protection system devices (e.g., 16–22) have an associated connection assembly (four shown, 50–56) interposed between the respective device and the bus 36. In the illustrated example, the four air bag modules 16–22 each have associated, respective connection assemblies. Each connection assembly (e.g., 50) allows the associated protection system device (e.g., air bag module 16) to be positioned at a location that is spaced away from the bus 36.

For the connection assemblies (e.g., 50, FIG. 2) associated with the air bag modules (e.g., 16), each connection assembly includes an initiator plug 60 at one end of the connection assembly. A pair of connection leads 62 extend from the initiator plug 60 and interconnect with the connection leads 26 of the initiator 24 of the respective air bag module (e.g., 16). A pair of connection lines 64 and 66 extends from the initiator plug 60 to a bus plug unit 68. The bus plug unit 68 contains control circuitry 70 (e.g., electronics) for the associated air bag module (e.g., 16), and interfaces with one of the bus connection units (e.g., 42) of the bus 36 via three connection leads 72–76 and a projection 78. Each of the connection assemblies 50–56 includes the components identified by the common reference numerals 60–78 (although not every component shown/identified for the connection assemblies 52–56).

The control circuitry 70 (FIG. 2) communicates with the central controller 14 via the bus 36. In response to a communication from the central controller 14 that is a command to actuate the respective air bag module (e.g., 16) the control circuitry 70 provides a electrical signal (e.g., a sufficiently large current) through the connection lines 64, 66 to cause activation of the initiator 24 of the air bag module.

Because the control circuitry 70 is located within the bus plug unit 68, the control circuitry is located at some distance away from the associated air bag module (e.g., 16). For example, the driver side air bag module 16 is located in the driver door 28, while the bus plug unit 68 of the associated connection assembly 50 is within a chassis portion 80 of the vehicle 12. As another example, the driver front air bag module 18 is on the steering wheel 30, while the bus plug unit 68 of the associated connection assembly 52 is located within the chassis portion 80.

Location of the control circuitry 70 away from the associated protection system (e.g., air bag module) provides a measure of isolation away from activity at the associated protection system device. For example, the control circuitry 70 is not subject to physical disturbance (e.g., such as during actuation during a collision) at the air bag module location.

Also, the actuatable protection system devices (e.g., the air bag modules 16–22) are often located within portions of the vehicle 12 where available space is limited. For example, the hub of the steering wheel 30 has a limited amount of space to accommodate the driver front air bag module 18. Location of the bus plug unit 68, along with the included control circuitry 70, remote from the associated protection system device (e.g., air bag module) eases the demand on space at the location of the protection system device.

Connection of each bus plug unit 68 to one of the bus connection units (e.g., 42) of the bus 36 is relatively expedient. Specifically, each bus connection unit (e.g., 42) contains a normally closed shorting clip 84 located along one of the bus conductors (e.g., 38) of the bus 36. In its normally closed condition, the shorting clip 84 passes electrical signals through the respective bus connection unit (e.g., 42) without interruption or detour. In other words, the shorting clip 84 is a part of a through-connected portion of the first conductor 38 when the shorting clip is in its closed condition.

Three connection leads 86–90 extend from the bus connection unit (e.g., 42). The first connection lead 86 is connected to the first bus conductor 38 on a first side of the shorting clip 84. The second connection lead 88 is connected to the first bus conductor 38 on the other side of the shorting clip 84. The third connection lead 90 is connected to the second bus conductor 40.

During connection of the bus plug unit 68 to a respective one of the bus connection units (e.g., 42), the three connection leads 72–76 mate with the three connection leads 86–90, respectively. The projection 78 of the bus plug unit 68 moves the shorting clip 84 to an open condition during connection of the bus plug unit 68 to the respective bus connection unit (e.g., 42). The shorting clip remains in the open condition so long as the bus plug unit 68 remains attached to the respective bus connection unit (e.g., 42).

With the shorting clip 84 open, electrical continuity through the shorting clip 84 is interrupted. However, with the control circuitry 70 connected is to the first bus conductor 38 on either side of the open shorting clip 84, the control circuitry 70 is connected in series along the first bus conductor 38.

The bus 36, with its bus connection units (e.g., 42–48), is designed such that the bus can be utilized on various vehicle platforms. The bus connection units (e.g., 42–48) need not be located in close proximity to the protection system devices (e.g., 16–22). The bus connection units (e.g., 42–48) need only be located at accessible points to attach bus plug units 68 of connection assemblies (e.g., 50–56). The connection assemblies (e.g., 50–56) extend to reach the respective protection system devices (e.g., 16–22).

Further, extra bus connection units (none shown) on the bus 36 do not interrupt bus communication because the shorting clip 84 within each such extra bus connection unit remains closed until a bus plug unit 68 is connected. Thus, the bus 36 can be manufactured to have a number of bus connection units necessary to accommodate the needs of a vehicle design with a large number of protection system devices. That bus 36 can be used in a vehicle that has a different, lesser number of protection system devices.

Figure 3:
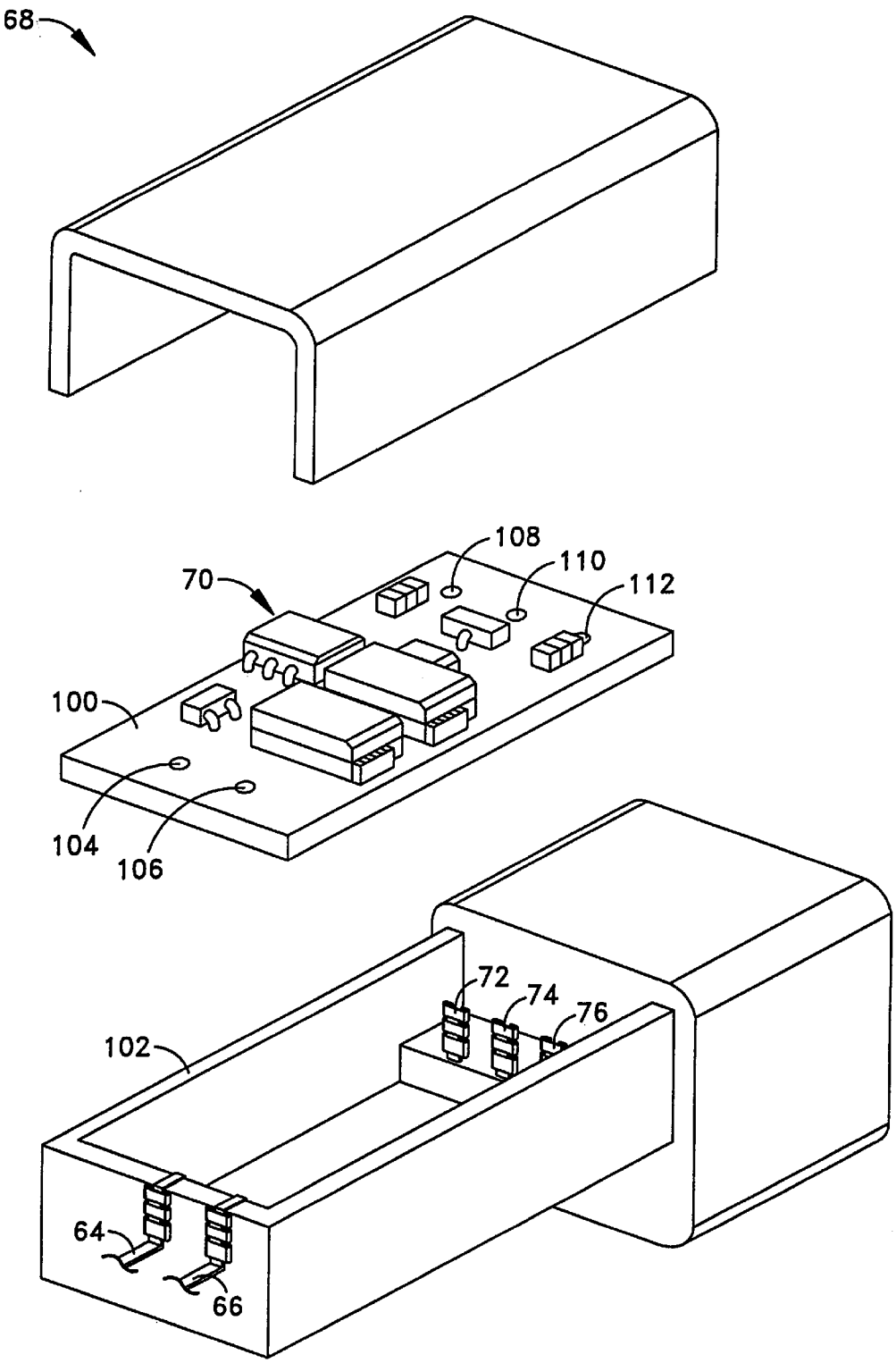
FIG. 3 is an exploded perspective view of a bus plug unit shown in FIG. 2.

FIG. 3 shows an example embodiment of the bus plug unit 68. The control circuitry 70 is provided on a printed circuit board 100 located within a robust plastic housing 102. The circuit board 100 has connection elements 104 and 106 for the lines 64 and 66, respectively, and connection elements 108–112 for the connection leads 72–76, respectively.

Figure 4:
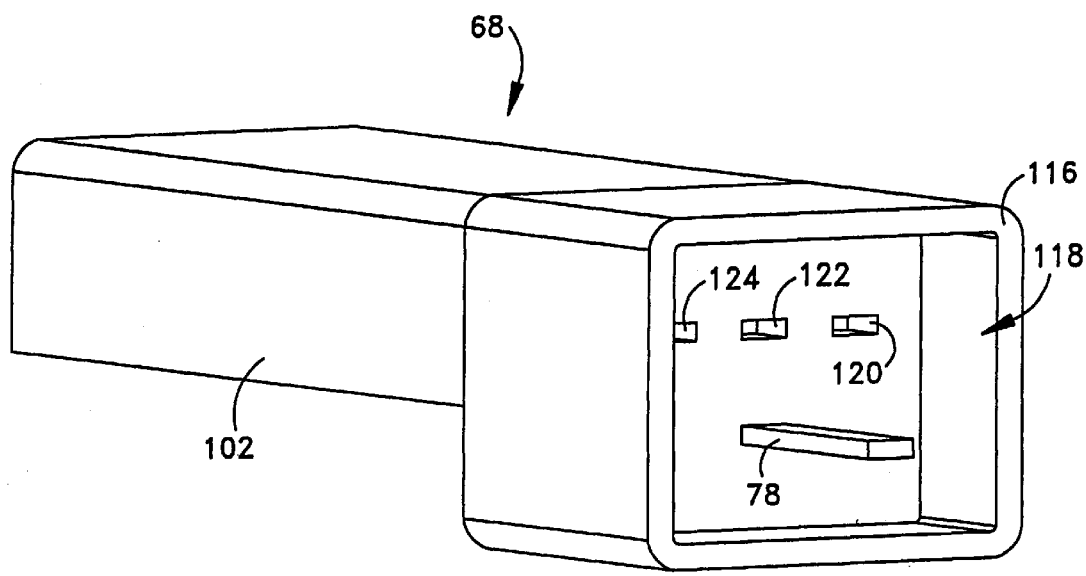
FIG. 4 is a reverse angle perspective view of the bus plug unit shown in FIG. 3.

One end of the housing 102 is shaped as a shroud 116 (FIG. 4) about a recess area 118. Three openings 120–124 extend through the housing 102 and are located within the recess area 118 of the shroud 116. The three connection leads 72–76 are located within the housing 102, adjacent to the three openings 120–124, respectively.

The projection 78 is within the recess area 118 of the shroud 116. The projection 78 is adjacent to the three openings 120–124. In one embodiment, the projection 78 is made of the same plastic material as the housing 102.

Figure 5:
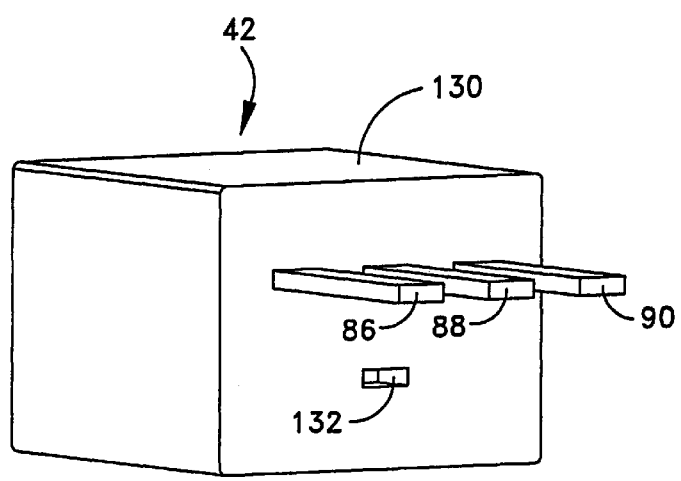
FIG. 5 is a perspective view of a bus connection unit shown in FIG. 2.

The bus connection unit (e.g., 42, FIG. 5) includes a plastic housing 130 that has outer dimensions such that the housing fits into (i.e., mates with) the shroud 116 (FIG. 4) of the bus plug unit 68. The three connection leads 86–90 extend outward through the housing 130. An opening 132 through the housing 130 is located adjacent the connection leads 86–90. The shorting clip 84 (not visible in FIG. 5) is located within the housing 130 adjacent to the opening 132.

When the housing 130 of the bus connection unit 42 mates into the shroud 116 of the bus plug unit 68, the connection leads 86–90 extend into the openings 120–124 and contact the connection leads 72–76. The projection 78 extends through the opening 132 in the housing 130 to engage and move the shorting clip 84.

From the above description of the invention, those skilled in the art will perceive improvements, changes and modifications. Such improvements, changes and modifications within the skill of the art are intended to be covered by the appended claims.

What is claimed is:

1. A distributed vehicle safety system comprising:
   an actuatable safety system device;
   a central controller for outputting communication regarding actuation of said device;
   bus means for conveying the communication; and
   connector/control means for interrupting a normally through-connected portion of said bus means to enable communication reception from said bus means by said connector/control means, and for controlling actuation of said device in response to communication received at said connector/control means.

2. A distributed vehicle safety system comprising:
   an actuatable safety system device;
   a central controller for outputting communication regarding actuation of said device;
   a communication bus extending from said central controller toward said device and conveying the communication, said bus including a conductor; and
   a connector, associated with said device, for connection to said bus and receiving the communication, said connector including means for interrupting a through-connected portion of said conductor upon connection of said connector to said bus.

3. A system as set forth in claim 2, wherein said connector includes means for controlling actuation of said device in response to communication received at said connector.

4. A system as set forth in claim 2, wherein said device is a first device and said connector is a first connector, said system having a plurality of actuatable safety system devices, said system having a plurality of connectors associated with said plurality of devices, each of said connectors for connection to said bus including means for interrupting a through-connected portion of said conductor upon connection of said respective connector to said bus.

5. A connector plug of a vehicle safety system for connection into an communication bus that includes an electrical conductor, said connector plug comprising:
   means for interrupting a through-connected portion of the conductor during connection of said connector plug to the bus;
   means for connecting to the conductor on one side of the interrupted portion; and
   means for connecting to the conductor on the other side of the interrupted portion.

6. A connector plug as set forth in claim 5, including means for connection to an actuatable occupant protection device, and circuitry for receiving and processing communication regarding actuation of the device via the communication bus.

7. A distributed vehicle safety system comprising:

an actuatable safety system device;

a central controller for outputting communication regarding actuation of said device;

a communication bus extending from said central controller toward said device and conveying the communication, said bus including a conductor; and a connector, associated with said device, for connection to said bus and receiving the communication, said connector including means for interrupting a through-connected portion of said conductor upon connection of said connector to said bus;

wherein said bus includes a connection unit for mating with said connector upon connection to said bus, said through-connected portion of said conductor includes a movable portion housed with said connection unit, said connector includes a projection for extension into said connection unit and for moving said movable portion.

8. A distributed vehicle safety system comprising:

an actuatable safety system device;

a central controller for outputting communication regarding actuation of said device;

a communication bus extending from said central controller toward said device and conveying the communication, said bus including a conductor; and a connector, associated with said device, for connection to said bus and receiving the communication, said connector including means for interrupting a through-connected portion of said conductor upon connection of said connector to said bus;

wherein said connector includes means for connecting to said conductor on one side of said interrupted portion, means for connecting to said conductor on the other side of said interrupted portion, and circuitry connected to said means for connecting to said conductor on one side of said interrupted portion and connected to said means for connecting to said conductor on the other side of said interrupted portion, such that electrical continuity along said conductor can be established through said circuitry.

9. A connector plug of a vehicle safety system for connection into an communication bus that includes an electrical conductor, said connector plug comprising:

means for interrupting a through-connected portion of the conductor during connection of said connector plug to the bus;

means for connecting to the conductor on one side of the interrupted portion; and means for connecting to the conductor on the other side of the interrupted portion;

wherein the conductor is a first conductor, the bus has a second conductor, said connector plug includes means for connecting to the second conductor.

10. A connector plug of a vehicle safety system for connection into an communication bus that includes an electrical conductor, said connector plug comprising:

means for interrupting a through-connected portion of the conductor during connection of said connector plug to the bus;

means for connecting to the conductor on one side of the interrupted portion;

means for connecting to the conductor on the other side of the interrupted portion; and circuitry connected to said means for connecting to the conductor on one side of the interrupted portion and connected to said means for connecting to the conductor on the other side of the interrupted portion, such that electrical continuity along the conductor can be established through said circuitry.

11. A distributed vehicle safety system comprising:

an actuatable safety system device;

a central controller for outputting communication regarding actuation of said device;

a communication bus extending from said central controller toward said device and conveying the communication; and connector/control means, located remote from said device and remote from said control controller, for connection to said bus and for controlling actuation of said device in response to communication on said bus.

12. A system as set forth in claim 11, wherein said connector/control means includes circuitry for processing the communication, which proceeds from said central controller on said bus to said connector/controller means, regarding actuation of said device and for outputting an actuation signal to said device.

* * * * *